United States Patent
Bareyt et al.

(10) Patent No.: US 12,007,059 B2
(45) Date of Patent: Jun. 11, 2024

(54) INSULATION PROCESS AND APPLIANCE OBTAINED

(71) Applicant: SAINT-GOBAIN ISOVER, Courbevoie (FR)

(72) Inventors: Christophe Bareyt, Saint-leu d'Esserent (FR); David Gogeon, Villers Saint Paul (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 1145 days.

(21) Appl. No.: 16/318,914

(22) PCT Filed: Jul. 18, 2017

(86) PCT No.: PCT/FR2017/051956
§ 371 (c)(1),
(2) Date: Jan. 18, 2019

(87) PCT Pub. No.: WO2018/024962
PCT Pub. Date: Feb. 8, 2018

(65) Prior Publication Data
US 2019/0186675 A1     Jun. 20, 2019

(30) Foreign Application Priority Data

Aug. 1, 2016 (FR) ...................... 1657467

(51) Int. Cl.
 *F16L 59/04*     (2006.01)
 *F24C 15/08*    (2006.01)
 *F24C 15/34*    (2006.01)

(52) U.S. Cl.
 CPC .............. *F16L 59/04* (2013.01); *F24C 15/08* (2013.01); *F24C 15/34* (2013.01)

(58) Field of Classification Search
 None
 See application file for complete search history.

(56) References Cited

U.S. PATENT DOCUMENTS 2,235,542 A      3/1941  Wenzel
2,390,438 A  * 12/1945  Hobson .................. F24C 15/08
                                                          126/39 B
(Continued)

FOREIGN PATENT DOCUMENTS

FR      2620521 A1     3/1989
FR      2996904 A1 *   4/2014  ........... D04H 1/4218
(Continued)

OTHER PUBLICATIONS

Crane and McLaren, "Insulation Materials: Rock and Slag Wool Insulation: A Sustainable Choice", Insulation Outlook, Available at: https://insulation.org/io/search-articles/?category=-1&author=0&article-month=07&article-year=2008 (Year: 2008).*

(Continued)

Primary Examiner — Jason Lau
(74) Attorney, Agent, or Firm — Oblon, McClelland, Maier & Neustadt, L.L.P.

(57) ABSTRACT

A process is for insulating an appliance, in particular a three-dimensional appliance likely in particular to be exposed to high temperatures, such as a domestic oven. The appliance has one or more internal spaces to be insulated. Flakes and/or nodules of wool(s) and/or fibers, in particular mineral wool(s) and/or fibers, are blown into the space(s) to be insulated without adding binder or water.

12 Claims, 1 Drawing Sheet

(56) References Cited

U.S. PATENT DOCUMENTS

| | | | |
|---|---|---|---|
| 4,542,040 A | 9/1985 | Nowak | |
| 2005/0188649 A1* | 9/2005 | Hagen, Jr. | E04C 2/386 52/745.05 |
| 2008/0003431 A1 | 1/2008 | Fellinger et al. | |
| 2008/0087557 A1* | 4/2008 | Evans | B65D 75/5827 206/83.5 |
| 2013/0019393 A1* | 1/2013 | Lamberson | A61H 33/6005 4/584 |

FOREIGN PATENT DOCUMENTS

| | | |
|---|---|---|
| KR | 101288815 B1 * | 7/2013 |
| WO | WO 01/36859 A1 | 5/2001 |

OTHER PUBLICATIONS

International Search Report dated Oct. 26, 2017, in PCT/FR2017/051956, filed Jul. 18, 2017.

* cited by examiner

INSULATION PROCESS AND APPLIANCE OBTAINED

The present invention relates to the field of insulation, mainly to the field of thermal insulation, and more particularly concerns the insulation of three-dimensional devices (or appliances) likely to be exposed to high temperatures (which may in particular reach several hundreds of degrees), such as baking ovens, in particular intended for domestic use. The present invention also relates to the insulated appliances obtained.

It is known to insulate oven parts, for example the heating (or baking) chamber (or box or muffle), to protect the components present around the chamber or the external parts of the oven from heat or overheating, this insulation also making it possible to prevent heat losses to the outside of the chamber and to improve the energy performance of the oven during the use thereof. The insulating materials used must be able to withstand the high temperatures to which they are (at least temporarily) exposed and to retain their performance (in particular mechanical performance, or sufficient insulating performance) at these temperatures without risk of degradation or emissions that are potentially dangerous to health.

The insulating materials customarily used for insulating these chambers are felts or mats of mineral wool, the temperature resistance of which is much appreciated and which are installed or inserted, generally manually, around the chamber.

However, although it is easy to insulate flat surfaces or external surfaces of objects or appliances with these insulating products in form of panels or sheets that are readily available commercially, it is more difficult to shape these insulating materials to three-dimensional objects, especially when the shape of the object is complex or when the spaces into which they must be inserted are of variable shape and thickness.

In the case of domestic ovens where the insulation is positioned around the chamber (or muffle) made of enameled sheet metal that delimits the heating zone of the oven, the insulation operation consists in cutting the mineral wool batts of various thicknesses and densities, to the appropriate dimensions and in applying them against the surfaces to be insulated, by proceeding in various ways depending on whether it is a question of insulating the belt (formed by the two side faces and by the lower and upper faces) or the rear face of the oven: for the belt, use is generally made of a ply of insulating material wound around the chamber, whereas for the rear face insulating material is simply added in sheet form.

This procedure has a certain number of drawbacks: the installation of these insulating materials may be complex or may need to be carried out before assembly of the outer chamber of the oven, it also requires the cutting of the insulating materials and the manual installation thereof, these various operations adding to the installation time of the insulating materials and in particular possibly posing problems for the operator (skin irritation, dust, etc.).

Moreover it is difficult to obtain perfectly continuous contact with the insulating material over the entire surface of the chamber: depending on the way in which the operator proceeds, air spaces may remain which are responsible for heat losses between the chamber and the insulating material. Since the thickness and the density of the layers of mineral wools used are additionally limited by the capacities of the existing production lines, poorly insulated zones (thickness unsuitable for filling the changing spaces or reliefs of the oven carcasses) and thermal bridges, etc. may also result therefrom.

In addition, in order to ensure the mechanical integrity of the insulating coating, the insulating materials are generally impregnated with binders, in particular organic binders, which may give rise to undesirable gaseous emissions at high temperature, or use is made of needle-punched products, the rigid structure of these types of products possibly creating a barrel effect (bending of the insulating material around the carcass) which is also a source of thermal bridges, the corners and recesses of the cavity to be insulated in particular remaining empty (the insulating material in particular not having sufficient expansion due to its mechanical strength).

Document WO 93/01444 proposes a process in which the insulation is formed by spraying a mineral fibrous material onto the surface of an object with simultaneous wetting of the fibers by water and/or a binder, followed by the shaping of the sprayed layer then the drying/curing of the shaped layer. Although it reduces the drawbacks linked to the direct handling of mineral wool, this technique still gives rise to dust fly-off and poses workstation cleaning problems. Moreover, it is difficult to control the amount of material deposited and in particular the homogeneity of the density of the material applied, the various treatments carried out being much more expensive in terms of time (for example of the order of several hours) than the time needed for the installation of conventional insulating materials once cut (in particular of less than one minute).

Document WO 2001/036859 describes another process in which the insulation is formed by blowing flakes of mineral wool between the surface to be insulated and an envelope such as a metal foil or a glass web, the flakes being transported by a gas stream while directing on the flakes at least one jet of aqueous binder (making it possible in particular to avoid dust fly-off, to transport and apply the flakes and to subsequently rigidify the layer once dry) in order to form a layer delimited by the envelope, before drying in order to eliminate the water. This technique is moreover based on the use of standard, low flow rate conical nozzles, the pressure of the gas used being of the order of 50 to 120 mbar, and the fibers/binder stream possibly having an angle of incidence between +15° and −15° relative to the surface to be insulated. The risks of dust fly-off are reduced by this technique or even eliminated. However, this process remains lengthy to carry out, the insulation by this technique requiring a time for filling the cavities of the oven of generally greater than 3 min for a mineral wool density for example of the order of 60 kg/m$^3$, the various regions of the cavity moreover being insulated successively. Problems of coalescence of the bound flakes in contact with the surface to be insulated are also observed, which may lead to a density inhomogeneity at certain locations, the density of flakes obtained in the cavity generally not exceeding moreover 60 kg/m$^3$, thus limiting the insulation performance obtained.

The invention has therefore sought to develop an improved insulation technique that makes it possible to obviate at least one of the drawbacks stated above, in particular an insulation technique that is simple and convenient for the operator to implement, making it possible to obtain good, in particular improved, insulation performance, in particular for the insulation of three-dimensional appliances (or devices) having one or more internal spaces (internal surfaces or cavities) to be insulated in particular that are complex or have an irregular cross section, and in particular for the insulation of appliances likely to be exposed to high temperatures, such as ovens, in particular domestic ovens.

This objective has been achieved by the insulation process according to the invention. One subject of the present invention is thus a process for insulating an appliance (or device), in particular likely to be exposed to high temperatures (such as for example a domestic oven), said appliance having one or more internal spaces (or cavities) to be insulated, in particular three-dimensional internal spaces, wherein flakes and/or nodules of (or made of) wool(s) and/or fibers, in particular mineral wool(s) and/or fibers, are blown (in a gas stream) into said space(s) to be insulated (into the cavity or cavities or between the surface(s) to be insulated and one or more adjacent walls), (the blowing being carried out) without addition of (or without adding), during the blowing, binder or water, or in other words, free and dry flakes and/or nodules of wool(s) and/or fibers, in particular mineral wool(s) and/or fibers, are blown are blown into said space(s).

The expression "three-dimensional spaces to be insulated" is understood to mean internal spaces or cavities delimited by two main surfaces opposite one another, of which at least one (but preferably both) has a three-dimensional shape, i.e. a shape that is not rigorously flat, in particular may be a succession of contiguous planes joined by right-angled or curved bends. A particular surface shape that delimits a three-dimensional cavity may be inscribed in a substantially cubic shape.

Without addition of binder during the blowing is understood in the preceding definition as meaning without addition during the blowing of substance/compound(s) (in particular in liquid or even solid form) suitable for binding the blown flakes/nodules to one another. As indicated below, the presence of a compound conventionally described as "binder" but not capable of binding the flakes/nodules to one another, for example a compound or binder that has already reacted, in particular in the flakes/nodules used for the blowing, is not however excluded. Preferably however, the flakes/nodules inserted into the blowing device are free of binder(s) (even already reacted binder(s)), in the same way as the flow of material blown, as specified again below.

The blowing of the flakes and/or nodules according to the invention is therefore carried out without deliberate addition of binder (having the ability to bind said flakes/nodules) or water, the flakes and/or nodules blown into the space to be insulated therefore being "free" or separable or not bound together by a binder, and said flakes/nodules also being dry, that is to say with no water added in particular during the blowing, with a possible moisture content (or possible water content), in said flakes/nodules, and also in the flow of material sprayed, of less than 2% by weight, in particular less than 1% by weight, relative to the weight of the material blown by the blowing gas stream, the moisture from the ambient air, indeed, being able in particular to be absorbed into the blown material.

The blowing carried out according to the invention may in particular be described as "dry" blowing or blowing that is carried out "dry" or "via a dry process", with no added medium (in particular liquid medium) of water or (organic or inorganic) binder type, the entire flow (or all the material) sprayed (formed at least of the flakes or nodules but that may also comprise additional compounds such as aerogels or additives, as specified below) advantageously being free of added water and binder. The term "added" is understood to mean added during the insulating process in the spraying/blowing device used for depositing the insulating material/insulating layer, on the flakes or nodules before they reach the part to be insulated and/or into the blowing gas stream (through the same feed as the flakes or nodules or through another feed), knowing that, as already mentioned, the flakes or nodules may for their part already comprise a binder before they are blown, in particular a binder derived from their manufacturing process and that may be present at contents generally of less than 8% by weight of dry binder relative to the weight of said flakes or nodules (as introduced into the blowing device), this binder being in this case incapable of binding them together during the blowing or in the appliance obtained since it is in particular already polymerized or crosslinked or cured or hardened or has already reacted. Other materials or substances may, where appropriate, be added during the blowing as long as in particular these are not binders or water, in particular other solid insulating materials, or additives in small proportions, as indicated below.

The flow of material (formed of solid components and optionally liquid components) blown into the internal space to be insulated may thus comprise, besides the flakes and/or nodules of wool(s) and/or fibers:

less than 2%, preferably less than 1%, by weight (relative to the weight of the material blown by the blowing gas stream) of moisture/water, essentially originating from the ambient air, optionally less than 8% of binder lacking the ability to bind (or incapable of binding) the flakes and/or nodules together, originating essentially from the process for manufacturing the flakes and/or nodules and that is already on and/or in the flakes introduced into the blowing device, this binder being already polymerized or crosslinked or cured or hardened or having already reacted, optionally one or more other components as long as this does not include binder(s) still capable of binding the flakes/nodules together and as long as this does not include water-containing component(s) (this (these) component(s) therefore being free of water), in particular:

one or more additional insulating materials, in particular in the form of particles, in particular aerogels, one or more additives, in a small proportion, in particular at less than 1% by weight (relative to the weight of the material blown by the blowing gas stream), and preferably at less than 0.5% by weight, for example one or more additives of mineral oil, antistatic, silicone, etc. type.

The flow (or the material) blown (or sprayed) is thus advantageously essentially (preferably to at least 98% by weight of the sprayed material forming the insulating layer, and up to 100% by weight) formed of dry material (also predominantly, or essentially, solid or formed, or constituted, of solid particles), formed in particular of the aforementioned flakes and/or nodules, transported by the gas stream, and that fill the space to be insulated in order to form a thermally insulating barrier (in the form of at least one insulating layer). One or more liquid components, in particular one or more additives, may where appropriate be present, for example one or more mineral oils, the content of these liquid components or additives preferably being less than 1% by weight, in particular less than 0.5% by weight, relative to the weight of sprayed material, this content preferably being zero, the gas stream preferentially spraying only solid particles, advantageously formed for the most part (to at least 95% by weight) or even solely, of insulating materials, said insulating materials comprising at least the aforementioned flakes or nodules of wool(s) and/or fibers.

Although it is not excluded in the present invention for the flakes or nodules used to already incorporate an (already reacted) organic or inorganic binder, derived in particular from their manufacturing process, the content of this binder advantageously does not exceed 8% by weight as indicated previously, this optionally present binder preferably being inorganic or mineral. Preferably, the flakes or nodules used are chosen to be free of binder, in the same way as they are free of water (the optional residual water originating where appropriate from the ambient moisture).

The present invention also relates to a blowing device particularly suitable for the implementation of the process according to the invention, as described below.

The present invention also relates to a thermally insulated appliance advantageously obtained according to the process of the invention, as described below.

The structure of the flakes or nodules and the method of blowing according to the invention into the space to be insulated, for example (into) the cavity or cavities between the chamber or muffle of an oven and the adjacent external walls or the external box of the oven, make it possible to obtain an insulating layer having dimensions adapted to the reliefs of this space, without the installation of the insulating material presenting difficulties in accessing the parts to be insulated, and make it possible if required to obtain layers of greater densities than those obtained with the pre-existing processes (in particular greater than those obtained by a wet method, the process and the device according to the invention in particular making working at higher pressure possible), the flakes or nodules being distributed in all the recesses of the cavity to be insulated without risks of coalescence, the present invention thus making it possible to eliminate the problems of thermal bridges and to improve the insulation performance obtained. This good insulation improves the energy efficiency of the oven-type appliances and reduces their consumption while protecting the elements close to the heat source present in said ovens, and also the surroundings of these appliances, from the high temperatures used.

Neither does the present invention require a step of drying or treating the insulating material once deposited and for all that nor does it have, despite the absence of binder or water, problems linked to dust fly-off (the insulating material being confined within a closed space); the process is consequently rapid and does not require interruption of the production line, likewise it presents few risks linked to the handling of fibers, in particular mineral fibers.

Furthermore, the absence of binder or water surprisingly does not adversely affect the properties of the insulating material obtained and it is not necessary either to bind the flakes or nodules by another treatment, likewise it also proves unnecessary in the present invention to add anti-dusting agents, consequently eliminating any risk of emission of odors or of air pollutants generated by these types of agents or binders during the first operating cycles of oven-type appliances. Moreover, it is observed that no compaction of the flakes in the cavities occurs unlike wet blowing where such compactions may occur.

Advantageously, it is also possible, where appropriate, to couple the aforementioned flakes and/or nodules with other solid insulating materials in order to improve the thermal insulation performance or other performance (improvement of the fire resistant properties for example), as specified below.

The flakes or nodules of wool(s) or fibers used according to the invention are fibers in strands or blends (three-dimensional) or clusters or tufts or rovings or slubs, of fibers, in which the fibers are generally entangled, and not individualized fibers, the flakes (generally having a downy or fluffy appearance) being insulation products conventionally used for insulating the attic spaces of new houses or houses to be renovated. In the present invention, they make it possible to fill the interstices and recesses of the spaces to be insulated and oppose the circulation of air in these spaces, thus reducing the thermal conductivity of the assembly.

The flakes or nodules used according to the present invention are in particular made of (blown/blowable) mineral wool(s) and/or mineral fibers; use is for example made of flakes made of glass wool (or glass wool in flakes) sold by the companies Saint-Gobain Isover under the brand Comblissimo® or by the company Certainteed under the brand Optima®, or flakes made of rock wool (or rock wool in flakes) sold by the company Saint-Gobain Eurocoustic under the reference "Coatwool HP®".

These flakes or nodules may be produced from mineral fibers formed according to known processes, the fibers possibly then being made into nodules or strands (directly after drawing or subsequently), for example as explained in document FR-A-2 661 687.

They may also be obtained by grinding starting from any material based on mineral wool(s), preferably devoid of organic binder, for example starting from mineral wool felts or batts (in particular having a low content of components that may degrade at high temperature), such as those described in particular in documents EP-A-0 403 347, EP-A-0 819 788, DE-A-39 18 485.

Besides the flakes or nodules based on glass or rock wool(s) and/or fibers, it is also possible to use, as flakes or nodules according to the present invention, flakes or nodules of wool(s) and/or fiber(s) of ceramic or carbon type in particular. It is also possible to use flakes or nodules of the same type or where appropriate mixtures of two or more of these various types of flakes or nodules.

Preferably, the grinding in order to obtain the flakes or nodules, or the choice of the flakes/nodules is carried out/made so that these flakes/nodules have a size of less than 50 mm, preferably of less than 30 mm, irrespective of the shape of these flakes/nodules, in particular, for at least 50% (by weight), and preferably at least 75%, of the flakes, of between 5 and 25 mm, in order to enable a blowing and a filling that are particularly effective.

The size of a flake or nodule refers to its equivalent diameter, that is to say the diameter of the sphere that would behave in an identical manner during the particle size analysis of the flakes/nodules, the particle size distribution (set of particle sizes) being measured in particular by screening, for example with the aid of an automatic screening device sold under the reference RX-24 by the company Retsch Sieve Shaker, by superposing 4 screens (from the one having the smallest hole size positioned first on the vibrating support up to the one having the largest hole size positioned last, the sizes of holes (squares) successively (starting from the bottom) having sides of 6 mm, 10 mm, 19 mm and 25 mm), the power being set at 65% and the screening time being 5 min for 10 to 12 g of product, the mass of flakes/nodules present in each screen then being weighed. In particular from 30% to 75% by weight of the flakes/nodules used in the present invention have a size of between 10 and 25 mm, and between 5% and 30% of these flakes/nodules have a size of less than 6 mm.

The flakes or nodules are preferably based on fine wool(s) and/or fibers for good insulation performance. Particularly advantageously according to the invention, use is made of flakes and/or nodules of (or made of) glass or carbon or ceramic wool(s) (or fibers), with a micronaire preferably of less than 25 l/min, in particular of between 3 and 18 l/min, or flakes and/or nodules of rock wool(s) (or fibers), with a fasonaire preferably of greater than 150 mmwc and less than 350 mmwc (millimeters of a water column), in particular between 200 and 350 mmwc.

The fineness of the fibers is often determined by the value of their micronaire (F) per 5 g. The measurement of the micronaire, also referred to as "fineness index", takes into account the specific surface area by means of measuring the aerodynamic pressure drop when a given quantity of fibers is subjected to a given pressure of a gas—in general air or nitrogen. This measurement is standard practice in mineral fiber production units; it is carried out according to the DIN 53941 or ASTM D 1448 standard and uses what is called a "micronaire apparatus".

However, such an apparatus has a measurement limit when the fibers used are fine. For very fine fibers, it is possible and preferable to measure the fineness (or the "micronaire") in l/min using a known technique described in patent application WO 2003/098209. This patent application relates to a device for determining the fineness index of fibers, comprising a device for measuring the fineness index, said measurement device being provided with at least a first orifice connected to a measurement cell suitable for receiving a sample consisting of a plurality of fibers (in the present case a sample of the flakes or nodules), and with a second orifice connected to a device for measuring a differential pressure on either side of said sample, said differential pressure measurement device being intended to be connected to a fluid flow production device, the measurement device additionally comprising at least one volume flowmeter for the fluid passing through said cell. This device gives correspondences between "micronaire" values and liters per minute (l/min).

The fasonaire is, for its part, determined in the following manner: a test specimen (5 g) formed by a tuft of mineral wool (in the present case a sample of the flakes or nodules) free of oil and of binder but that may comprise non-fibrous components (slug) is weighed. This test specimen is compressed in a given volume and is passed through by a stream of gas (dry air or nitrogen) maintained at constant flow rate. The fasonaire measurement is then the pressure drop across the test specimen, evaluated by a water column graduated in conventional units. Conventionally, a fasonaire result is the average of the pressure drops observed for 10 test specimens, the measurement being expressed in millimeters of a water column (mmwc).

Besides the flakes and/or nodules, the blown flow or blown material may also comprise other compounds, in particular solid compounds, in particular other types of insulating materials, in order to further improve the insulation performance or other performance (improvement of the fire resistant properties for example). In particular and advantageously, the blown material may also comprise aerogels, preferably in particulate form, or in the form of small portions or particles or beads. These compounds, where appropriate of smaller size than the flakes and nodules used according to the invention, may also help to improve the insulation obtained by, where appropriate, filling in the interstices left by the flakes or nodules. Aerogels are generally more efficient insulating materials but are expensive, and may in particular be in the form of translucent granules or fine powder. The blowing of the flakes/nodules makes this addition of aerogels possible, the blowing of the aerogels alone posing problems, in particular in terms of safety and dust. The aerogels blown where appropriate with the flakes or nodules according to the invention are advantageously inorganic aerogels, in particular based on oxides, such as aerogels based on silica, aluminum and/or titanium, and preferably are one or more silica aerogels in the form of particles or granules or beads or powder. Advantageously, the size of the aerogel particles that can be used according to the invention is between 1 and 5 mm, and their content within the material sprayed preferably does not exceed 60% by weight (the aerogels generally being heavier than the flakes).

The blown material, or the flakes or nodules of wool(s) or fibers used according to the invention may also where appropriate comprise one or more additives added previously or during the blowing process, it being possible for these additives, where appropriate, to also be in the form of particles or granules or beads, such as antistatic additives, oils, etc. at contents advantageously of less than 1% by weight (for all of the additives).

Where appropriate, the flakes/nodules may act as carriers of these additives or other compounds and thus distribute them homogeneously in the space to be insulated.

The flakes or nodules of wool(s) or fibers used according to the invention, as well as the flow of sprayed material, preferably comprise a content of organic compounds (resulting for example from binder(s) or additives added during the manufacture of the fibers or batts of fibers then converted into flakes or nodules) of less than 8%, in particular of less than 1% by weight (of the blown material), and are advantageously free of organic compounds.

Furthermore, and as indicated previously, even though the presence of such agents is not excluded, it is not necessary to add anti-dusting agents to theses flakes/nodules or to the blown flow, the dust generated where appropriate remaining in particular trapped in the present invention in the insulated internal space. The content of anti-dusting agents (like the mineral oils or the antistatic agents) in the blown material is thus preferably less than 1% by weight relative to the weight of blown material, and advantageously the blown material is free of anti-dusting agent(s), making it possible to further limit the risks of emission of odors and pollutants (VOCs) as indicated previously.

The flakes or nodules of wool(s) or fibers and the other optional components of the blown material are conveyed and introduced into each of the spaces to be insulated by means of one or more blowing devices comprising at least one diffuser (or injector or nozzle) and at least one inlet duct/channel, connected to a blowing machine. Via this introduction, the risks of dust fly-off are reduced or even eliminated, thus making the work station more pleasant for the operator and less expensive in terms of maintenance. The introduction into an internal space delimited by one or more walls makes it possible to define the shape of the insulating layer at the very moment when it is applied in the internal space or against the surface to be insulated while controlling its thickness, the deposited layer then being protected by said walls or in said internal space.

The internal surface is a surface inside the appliance, in particular opening onto the periphery of said appliance, the adjacent surface(s) forming a cavity therewith, the cavity being a hollow space in said appliance, in particular opening (having an opening) at the periphery of the appliance. In the case for example of a domestic oven, the spaces (surfaces or cavities) to be insulated are in particular each of the faces or spaces forming the belt (side faces, upper face and lower face) around the chamber of the oven.

Where appropriate, certain outlets may be present in the walls, in particular external walls, delimiting the space to be insulated, in particular in the form of opening(s), of smaller size than that of the flakes or nodules or other insulating materials present where appropriate, or else in the form of opening(s) provided with filter(s) (such as a glass web) in order to stop the insulating materials while allowing the gas through, in order to enable a better evacuation of the blowing gas. The blowing gas used is preferably air.

The process according to the invention makes it possible to obtain insulating layers that already have their final shape, without requiring a subsequent shaping step, and also makes it possible to use much higher blowing flow rates than those used/reached in particular when spraying flakes/nodules with binder/water. Use is in particular made of blowing flow rates of the order of 40 to 90 g/s, making it possible in particular to obtain a density for the insulating layer obtained ranging up to 120 kg/m$^3$ (the flow rate in the case of wet blowing with water/binder being more of the order of 20 g/s), the density obtained possibly being between 40 and 120 kg/m$^3$, in particular between 50 and 120 kg/m$^3$, preferably between 60 and 120 kg/m$^3$, in particular between 80 and 120 kg/m$^3$, or even between 85 and 120 kg/m$^3$ The blowing gas pressure may itself reach 45 000 Pa, in particular be between 12 000 Pa and 45 000 Pa, preferably between 15 000 and 25 000 Pa, depending on the volume to be filled and the desired density.

Preferably, in the process according to the invention, the blowing gas stream is oriented substantially parallel to the mid-plane of the space to be insulated—for example, in the case of each oven cavity forming the belt of the heating chamber to be insulated, the gas stream is oriented substantially parallel to the internal face delimiting the cavity considered—with an angle between the blowing stream (or blown flow) and the plane (or the surface) considered of between +5° and −5°, in order to obtain a homogeneous and, where appropriate, sufficiently dense filling, and in order also to prevent the return of flakes/nodules to the blowing nozzle, which may possibly block the latter.

Preferably also, in the case where the appliance to be insulated has several spaces (cavities or internal faces) to be insulated, the blowing is advantageously carried out simultaneously into several of said spaces, the flow of flakes/nodules in particular being divided into as many streams (or subsidiary flows) as spaces to be insulated before being blown into said spaces. Advantageously also, the material blown into each space is blown from a point (where the outlet orifice in question of the blowing device is located) which is movable (for example movable in translation along the space to be insulated) so that the filling of the cavity is carried out gradually from one end of the cavity to the other, where appropriate following a common movement when the filling of several cavities is carried out simultaneously. Alternatively, the material may be blown from fixed points (in particular opening at the end of the cavity in question).

The present invention also relates to a blowing device particularly suitable for the implementation of the process according to the invention, suitable in particular for the insulation of ovens, in particular domestic ovens.

The blowing device used comprises in particular at least one diffuser (or injector or nozzle) having an outlet area capable of fitting (or slotting) into at least one portion or the whole of an opening (of the appliance to be insulated) of an, or opening onto an, internal space to be insulated, so that the flow leaving the diffuser is essentially parallel (or tangent) to the mid-plane of said space (or else mid-plane relative to the lateral walls of said space).

The expression "essentially parallel" is understood to mean parallel to the plane in question, with a tolerance of the angle between the blowing stream (or blown flow or flow leaving the device) and the plane in question of between +5° and −5°.

The device also comprises at least one distribution member (or system or means) (or "branch connector") and/or at least one mixer (or mixing member or system or means), and preferably comprises at least each one of these two elements.

The distribution member is in particular a branch connector or coupling that makes it possible to connect a central portion conveying a single flow of flakes/nodules to several ducts each equipped with a diffuser as defined above for distributing and where appropriate to inject, simultaneously, the flakes/nodules into several spaces to be insulated.

The mixer is in particular a sleeve of appropriate shape that makes it possible, depending on the case, to homogenize the flow of flakes/nodules in the cross section of the duct conveying said flakes/nodules from the blowing machine to the diffuser, or else to guide the flow to one diffuser in particular (for example for insulating a space where the heat losses are greater or for insulating a space that is narrower than the others, this preferential guiding making it possible to compensate for the lack of thickness by a greater density of insulating materials and thus making it possible to maintain an equivalent level of thermal resistance in all the insulated spaces, etc.). The mixer also makes it possible to homogenize the various components of the flow (for example the flakes and aerogels). This mixer, the internal relief of which is for example chosen to enable the orientation of the flow, is in particular a "static" or "convergent" mixer.

Several mixers may, where appropriate, be present in the device according to the invention. For example, a mixer may be provided at the outlet of the blowing machine, and/or, when a distribution member (branch connector) is present, a mixer may be provided at the inlet/upstream of this member in order to rectify a possible centering problem and/or to enable one and the same flow to be sent to several diffusers or to orient the flow preferentially to one portion of the branch connector, and/or a mixer may be provided between the branch connector and each diffuser, etc.

Preferably, the device according to the invention comprises several diffusers, each capable of fitting into at least one portion or the whole of an opening (of the appliance to be insulated) of a, or opening onto a, space to be insulated, and comprises at least one distribution member that distributes the flakes/nodules into each of the diffusers used. Particularly preferably, it comprises as many diffusers as internal spaces that can be insulated simultaneously within the appliance. For example, the device according to the invention intended for the insulation of an oven may advantageously comprise four diffusers, in particular which are similar, each capable of fitting into one of the four spaces forming the belt to be insulated, as illustrated below.

The diffuser(s) may be capable of fitting into the whole of/over the entire surface area or cross section of an opening of the respective space(s) to be insulated (for example the opening, in the rear portion of the oven before insulation, of one or each of the four cavities forming the belt to be insulated around the chamber or muffle of the oven), or into one portion only of said opening (preferably a large portion, in particular may occupy at least 90% of the surface area of said opening), and may be capable of sliding along the space in question in particular so that the filling of the space(s) is carried out gradually by movement (for example in translation) of the diffuser(s) in said space(s) (where appropriate simultaneously when there are several diffusers). In the preceding case of insulating an oven where four diffusers are advantageously used simultaneously, each diffuser may in particular have a cross section that coincides with the opening, at the rear of the oven, between the internal chamber or muffle of the oven and the wall adjacent to that of the lower or upper face or side of the oven where it should be inserted, as illustrated below (FIG. 1). The diffusers may where appropriate be contiguous and form a rigid structure.

The diffuser(s) may also, where appropriate, be stationary and be placed in an opening having in particular a small diameter, for example having a diameter of less than 50 or 30 mm, made or provided for this purpose in an outer wall of the oven (in particular opposite a space to be insulated), as illustrated below (FIG. 2), this procedure being advantageous in particular when it is a question of redoing the insulation of an oven already equipped with a rear portion.

The diffuser(s) may in particular be flat (or have a flat, in particular rectangular, flow area or outlet area), in the case in particular where they fit into each of the spaces (between the muffle and the housings or outer walls of the oven) forming the belt around a heating chamber of an oven, or they may have a round or oval flow area, for example when they are intended to be placed in one or more small-diameter openings made or provided in one or more outer walls of the oven.

Preferably, the diffusers used have a height (in the case of flat diffusers) or an internal diameter (in the case of diffusers with a round cross section) of the channel (or flow area of the flakes/nodules) of between 12 and 35 mm. In the case of diffusers with an oval cross section, the smallest axis of the cross section of the channel also preferentially has a length of between 12 and 35 mm.

Besides the diffuser(s) and where appropriate the distribution member(s) and/or the mixer(s), the blowing device according to the invention may also comprise other components, for example one or more handles or another system for handling the diffusers. It additionally comprises or is connected to a blowing machine, for example a blowing machine such as the ones sold under the references Fibermaster MK700, 750 or 1000 by the company Steward Energy, or under the references ISO 400 or ISO 300 by the company Isol France, or under the references X-Floc Zellofant M95, or EM320 or 325 by the company X-Floc, or under the reference Volu-matic by the company Certainteed MachineWorks.

Another subject of the invention is an appliance having at least one internal space, in particular that is three-dimensional, provided with at least one insulating layer, and which may be obtained by a process as described according to the invention, in particular a three-dimensional appliance likely to be brought to high temperatures, such as a heating appliance, which may reach in particular several hundreds of degrees (for example 450° C. or even 550° C. for pyrolysis ovens, and in particular between 50° C. and 350° C.), such as a baking oven, in particular intended for domestic use, said insulating layer being formed of flakes and/or nodules of wool(s) or fibers, in particular mineral wool(s) or fibers, the (optional) binder content being less than 8% by weight of the material forming said layer/of said layer, and advantageously being zero, and the initial water content being less than 2% by weight of said layer, and advantageously being zero.

Advantageously, as indicated previously, the density of the insulating layer is between 40 and 120 kg/m$^3$, in particular between 50 and 120 kg/m$^3$, preferably between 60 and 120 kg/m$^3$, in particular between 80 and 120 kg/m$^3$, or even between 85 and 120 kg/m$^3$.

In one embodiment, the insulating layer may also comprise other types of insulating materials such as particles (beads, granules, etc.) of aerogels.

Other features and advantages of the invention will become apparent from the following detailed description given with reference to the appended drawings in which.

Figure 1:
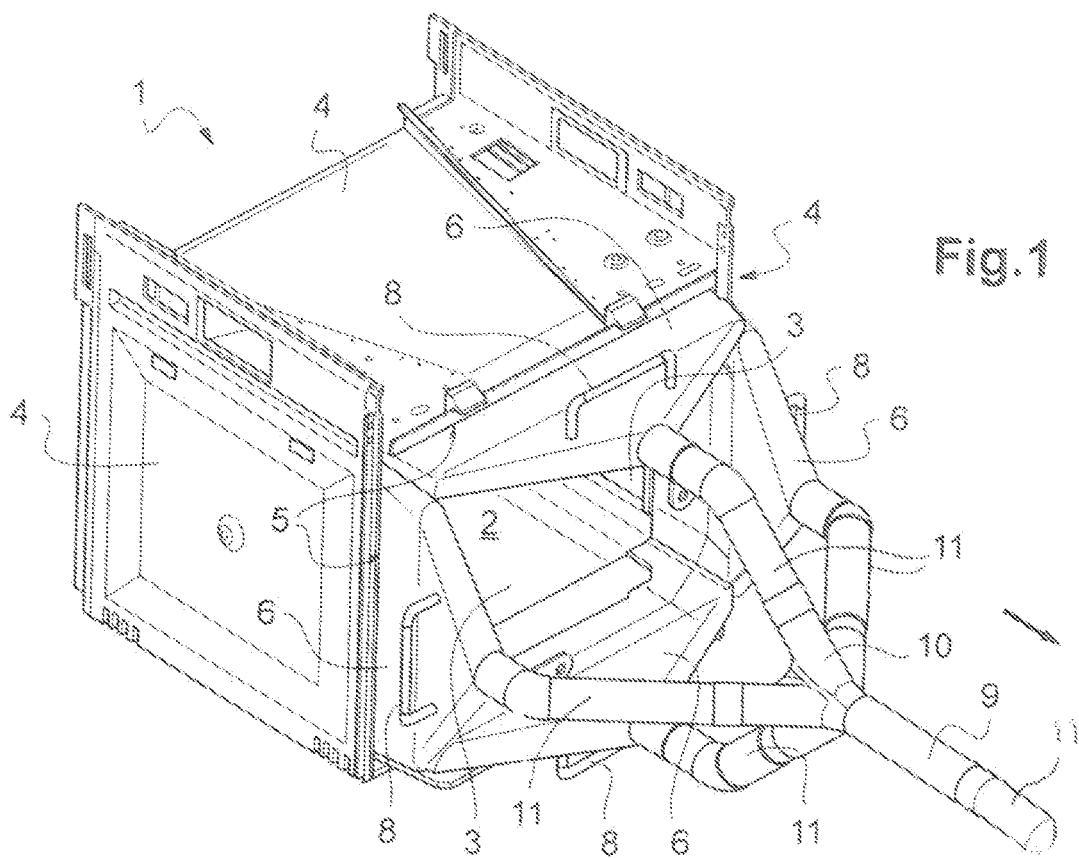
FIG. 1 represents a perspective view of a (muffle of a) baking appliance equipped with a blowing device for the implementation of the process according to the invention.

The baking appliance (or oven) 1 represented in FIG. 1 (respectively in FIG. 2) comprises a heating chamber (or muffle) 2 delimited by internal walls 3 and opposite external walls 4. Each internal wall and each opposite external wall forms an internal space in which thermal insulation is desired. The spaces on the sides, the top and the bottom of the oven form the belt that delimits the chamber of the oven.

Figure 2:
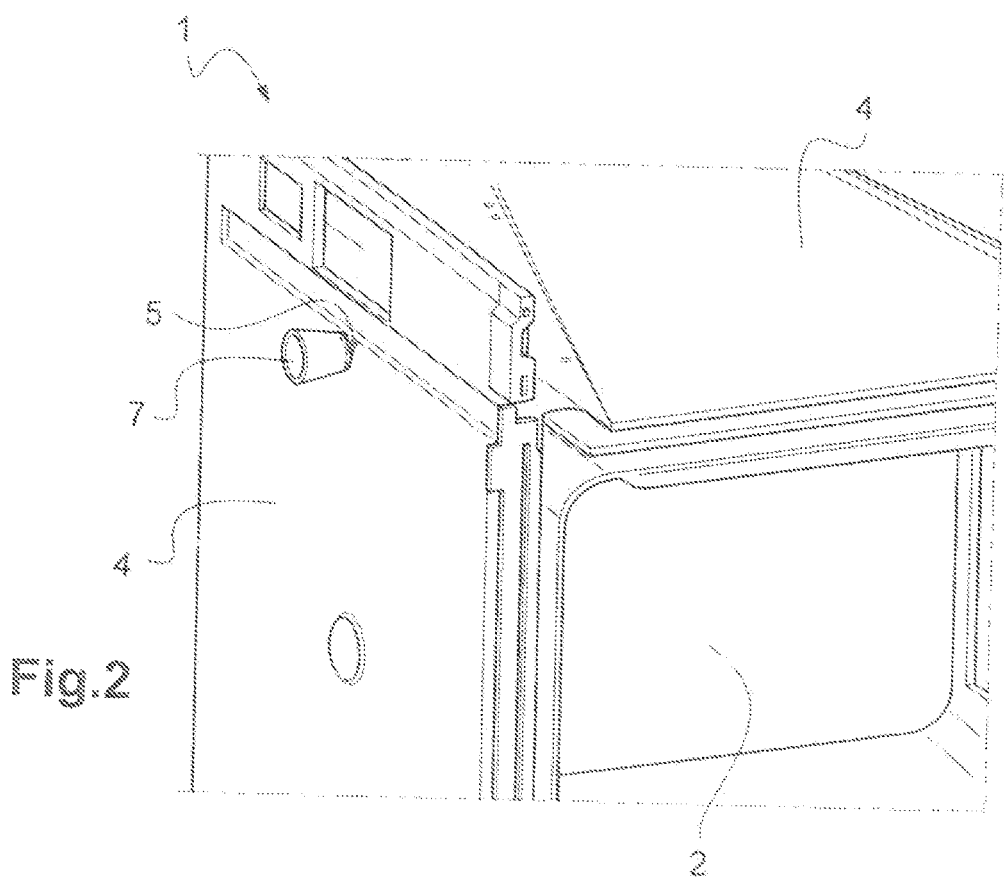
FIG. 2 represents a variant of the embodiment in FIG. 1.

The belt of the oven is insulated as follows according to the invention:

Introduced through each of the openings 5 that give access to the internal spaces to be insulated (whether the opening is present during manufacture as illustrated in FIG. 1, or made in an already existing oven, for example by perforation, as illustrated in FIG. 2) are diffusers (diffusers 6 in FIG. 1, and diffuser 7 in FIG. 2) of a blowing device, which are (is) connected to a blowing machine (not represented). In FIG. 1, each diffuser is flat so as to fit into the parallelepipedal opening at the end of each cavity that opens onto the rear face of the oven, and is provided with a handle 8 that enables the handling thereof. In FIG. 2, each diffuser has a round cross section and an internal diameter of the order of 10 to 50 mm, preferably 10 to 30 mm, and is placed in an opening made in an external wall, in particular opposite the cavity to be insulated (the diffuser 7 represented in FIG. 2 here being opposite the cavity to be insulated between the upper face of the muffle and that of the housing) at the center or in a corner where appropriate, a single opening and a single diffuser per face generally being sufficient to carry out the insulation of said face according to the invention.

The blowing machine comprises a supply of mineral wool flakes, "decaking" members intended to separate the flakes that are usually sold in sacks or compacted bales, one or more flake-conveying members (or ducts) 11, and a blower which directs a stream of pressurized air into the duct or ducts.

The blowing device also comprises a branch connector (or distribution member) 10 and one or more static mixers 9.

Since the diffusers are arranged substantially parallel to the internal surfaces in question of the oven, a gas stream bearing mineral wool flakes is blown into each cavity of the oven simultaneously. In FIG. 1, the mineral wool flakes are blown through a static mixer 9, then pass into a four-way branch connector 10 in order to distribute the flow of material into the four flat diffusers homogeneously or where appropriate in a targeted or preferential manner toward one of the diffusers. Once the blowing has begun, the filling of the cavities at the same time takes place gradually by translation of the diffusers toward the rear of the oven (or toward the opening of the cavities) following the direction of the arrow in FIG. 1 and until the diffusers fitted into the cavities leave the carcass.

The blowing flow rate used is of the order of 90 g/s. For a standard oven, for example of reference De Dietrich CZ5702359 sold by the company Brandt, and each cavity of which around the heating chamber measures around 45 cm per side, the filling time for an obtained density of insulating materials of the order of 70 kg/m³ is of the order of 25 s, and it is of the order of 30 s for a density of the order of 80 kg/m³ and of 35 s for a density of the order of 100 kg/m³. The filling rate is particularly efficient and the densities obtained may be particularly high, unlike in particular the densities obtained via a wet process or by using cut mineral wool mats.

The distribution of the flakes additionally takes place homogeneously with the aid of the mixer used. Thus, without a mixer, for an average density obtained of 70 kg/m³ in the four cavities, the standard deviation observed for the density within all of the cavities is 18 kg/m³, whereas the use of a convergent mixer (here that centers the flow) makes it possible to limit the standard deviation to 5.5 kg/m³, and the use of a static mixer (stationary and the shape of which makes it possible to mix and center or direct the flow) makes it possible to limit the standard deviation to 4.3 kg/m³.

The consumption of the ovens was also measured according to the EN60350 standard on an oven of reference De Dietrich CZ5702359 sold by the company Brandt, equipped with an insulating internal belt by firstly using the process of the invention to form this belt, then by replacing the insulation obtained with standard insulation using needle-punched felts of reference TNF 20/80 sold by the company Saint-Gobain Isover. The measurements of temperature rise at the core of the element to be heated were carried out on a brick sold under the reference Hipor by the company Skamol, the brick having previously been dried, then immersed in a water bath placed in the refrigerator for at least 8 hours until a brick temperature (measured in the brick by two thermocouples) of 5° C. is achieved, the water-saturated brick, drained for around 1 min, then being placed in the center of the oven.

The measurement of the energy consumption of the oven was carried out in "conventional heat" mode according to the EN60350 standard, where the heating temperatures (relative to the ambient temperature) are 140° K, 180° K and 220° K. The consumption of the oven corresponds to the arithmetic mean of the powers consumed for each of the three aforementioned temperature setpoints.

In the case of the oven having an insulating belt formed from the standard product, the consumption of the oven was 850 Wh. In case of the oven having an insulating belt formed from glass wool flakes of reference Optima, the consumption of the oven was 785 Wh.

The results obtained show that the use the process according to the invention for insulating domestic ovens and for other high-temperature uses makes it possible to obtain energy performances that are equivalent, and even better, than the performances customarily obtained, without having the drawbacks of the customary processes.

The process according to the invention may in particular be used advantageously for producing a new range of ovens having good insulation performance, or other appliances, in particular likely to be subjected to high temperatures, etc.

The invention claimed is:

1. A process for insulating an oven, the oven having one or more internal spaces, to be insulated, the process comprising:
   blowing flakes and/or nodules of wool(s) and/or fibers into the space(s) to be insulated without adding binder or water,
   wherein at least 50 wt. % of the flakes have a largest dimension in a range of from 5 to 25 mm,
   wherein the flakes and/or nodules are made of glass or carbon or ceramic wool(s) or fibers, with a micronaire of less than 25 L/min, and/or are made of rock wool(s) or fibers, with a fasonaire of greater than 150 mmwc,
   wherein the blowing gas pressure is in a range of from 12 to 45 kPa and/or in that the blowing flow rate is in a range of from 40 to 90 g/s,
   wherein the flakes from an insulating layer with a density in a range of from 40 to 120 kg/m³, and
   wherein the insulating layer takes a final shape without requiring a subsequent shaping.

2. The process of claim 1, wherein the flakes and/or nodules have a size of less than 50 mm.

3. The process of claim 1, wherein the flow of blown material comprises, besides the flakes and/or nodules of wool(s) and/or fibers:
   less than 2% by weight of moisture; and
   less than 8% of binder already polymerized or crosslinked or cured or hardened or that has already reacted.

4. The process of claim 1, wherein the flakes and/or nodules comprise a content of organic compounds of less than 8 wt. %,
   wherein the flakes and/or nodules have less than 8 wt. % of binder, and
   wherein the content of anti-dusting agents in the blown material is less than 1 wt. %.

5. The process of claim 1, wherein the blown material also comprises an aerogel.

6. The process of claim 1, wherein the blowing gas pressure is in the range of from 12 to 45 kPa.

7. The process of claim 1, wherein the blowing gas stream is oriented substantially parallel to the mid-plane of the space to be insulated, with an angle of incidence of the blowing stream with the plan of between +5° and −5°.

8. The process of claim 1, wherein the blowing is carried out simultaneously in several spaces to be insulated.

9. The process of claim 1, wherein the oven is a domestic oven.

10. The process of claim 1, wherein the flakes and/or nodules of wool(s) and/or fibers comprise mineral wool(s) and/or fibers.

11. The process of claim 1, wherein
   the blowing flow rate is in the range of from 40 to 90 g/s.

12. The process of claim 6, wherein the blowing flow rate is in the range of from 40 to 90 g/s.

* * * * *